United States Patent
Huang

(10) Patent No.: US 7,242,462 B2
(45) Date of Patent: Jul. 10, 2007

(54) SPEED DETECTION METHODS AND DEVICES

(75) Inventor: Dong Huang, Hang-Zhou (CN)

(73) Assignee: Asia Optical Co., Inc., Taichung (TW)

( * ) Notice: Subject to any disclaimer, the term of this patent is extended or adjusted under 35 U.S.C. 154(b) by 233 days.

(21) Appl. No.: 11/085,426

(22) Filed: Mar. 21, 2005

(65) Prior Publication Data

US 2006/0132755 A1 Jun. 22, 2006

(30) Foreign Application Priority Data

Dec. 21, 2004 (TW) .............................. 93139822 A

(51) Int. Cl.
*G01P 3/36* (2006.01)
(52) U.S. Cl. ...................... 356/27; 356/5.01
(58) Field of Classification Search .................. 356/28
See application file for complete search history.

(56) References Cited

U.S. PATENT DOCUMENTS

| | | | | |
|---|---|---|---|---|
| 4,907,154 A | * | 3/1990 | Yasuda et al. ................ 701/37 |
| 5,793,477 A | * | 8/1998 | Laakmann .................... 356/28 |
| 6,466,307 B2 | * | 10/2002 | Chien et al. ............... 356/5.03 |
| 2002/0063858 A1 | * | 5/2002 | Patterson ..................... 356/28 |

* cited by examiner

*Primary Examiner*—Thomas H. Tarcza
*Assistant Examiner*—Tim Brainard
(74) *Attorney, Agent, or Firm*—Thomas, Kayden, Horstemeyer & Risley

(57) ABSTRACT

A speed detection method. A range finder acquires a specific number of distance measurement samples of an object during a period of time. A new unit of measurement larger than respective movement distances of the object in a first period and a second period is acquired. Rough measured distances D1 and D2 respectively corresponding to the locations of the object in the first period and the second period are calculated by comparing portions of the distance measurement samples corresponding to the first period and the second period utilizing the new unit of measurement. A scope is determined based on the D1 and D2 for filtering the distance measurement samples. The speed of the object is calculated based the filtered distance measurement samples.

19 Claims, 5 Drawing Sheets

SPEED DETECTION METHODS AND DEVICES

BACKGROUND

The invention relates to electronic devices, and in particular, to speed detection methods and devices.

An optical range finder calculates distance by measuring the time during emitting a laser pulse at an object and receiving the reflected laser pulse. The pulse hits the object and is reflected back to the range finder. The speed of a moving object can be determined by acquiring two distances thereof at different times and dividing distance difference by the time difference. FIG. 1 is an ideal schematic diagram of laser reflected pulses by a moving object for distance measurement pulses to a moving object. Assuming the object is measured 200 times, FIG. 1 shows only a portion of distance measurements thereof. The horizontal axis in FIG. 1 represents distance, and the vertical axis represents the orders of reflected laser pulses, i.e. the distance measurements. The orders of reflected pulses have fixed intervals. Each reflected signal corresponds to a distance derived by a distance formula. The speed of the object can be calculated utilizing the reflected pulses distributed in FIG. 1. Reflected pulses may comprise noise due to sun light or other interference factors. Thus, the actual distribution of reflected signals received might be as shown in FIG. 2 (only a portion is shown). For getting the speed information from FIG. 2, it is necessary to filter the noise therein.

U.S. Pat. No. 6466307 B2 discloses a signal processing method and device for laser range-finder, taking the properties that the distribution of actual number of reflected laser pulses directed at an object is stable while noise is randomly distributed, and the actual reflected pulses are accordingly retrieved by statistics. A distance measurement by a conventional range finder, however, requires a certain period of time, such as 0.5 seconds, during which the moving object may continuously change locations, causing the distribution of actual reflected pulses to be unstable and disadvantageous to reflected pulse extraction.

Additionally, a speed measurement by a speed detector must also be acquired in a short time, such as 0.6 seconds, which is insufficient for two distance measurements by a typical range finder. Thus, a typical range finder has difficulty in acquiring two measured distances to determine speed.

SUMMARY

Accordingly, speed detection methods and speed detectors are provided.

An exemplary embodiment of a speed detection method is implemented in a speed detector comprising a range finder. The range finder acquires a specific number of distance measurement samples of an object during a period of time. A new unit of measurement larger than respective movement distances of the object in a first period and a second period is acquired. Rough measured distances D1 and D2 respectively corresponding to the locations of the object in the first period and the second period are calculated by comparing portions of the distance measurement samples corresponding to the first period and the second period utilizing the new unit of measurement. A scope is determined based on D1 and D2 for filtering the distance measurement samples. The speed of the object is calculated according to the filtered distance measurement samples.

An exemplary embodiment of a speed detection method is implemented in a speed detector comprising a range finder. The range finder acquires a specific number of distance measurement samples of an object. Each of the distance measurement samples comprises a sequence of reflected distance measurement laser pulse emitted by the range finder in a received pulse order. Each of the reflected pulses corresponds to a distance and is distributed in a planar coordinate system spanned by an time axis and a distance axis, and the time-axis and distance-axis coordinates of each reflected pulse respectively comprise the corresponding received pulse order and distance thereof. Rough measured distances D1 and D2 respectively corresponding to the locations of the object in a first period and a second period are calculated by comparing portions of the distance measurement samples corresponding to the first period and the second period. A first line on the planar coordinate system is determined based on the first period, the second period, distances D1, and D2. A scope is determined based the first line for filtering the distance measurement samples. The speed of the object is calculated according to the filtered distance measurement samples.

An exemplary embodiment of a speed detector comprises a range finder and a processor coupled thereto. The range finder acquires a specific number of distance measurement samples of an object during a period of time using the range finder. The processor acquires a new unit of measurement larger than the respective movement distances of the object in a first period and a second period and calculates, rough measured distances D1 and D2 respectively corresponding to the locations of the object in the first period and the second period by comparing portions of the distance measurement samples corresponding to the first period and the second period utilizing the new unit of measurement. A scope based on distances D1 and D2 is determined for filtering the distance measurement samples, and a speed of the object is calculated based the filtered distance measurement samples.

DESCRIPTION OF THE DRAWINGS

The invention can be more fully understood by reading the subsequent detailed description and examples with references made to the accompanying drawings, wherein.

DETAILED DESCRIPTION

Speed detection methods which can be implemented in speed detectors are provided.

Figure 3:
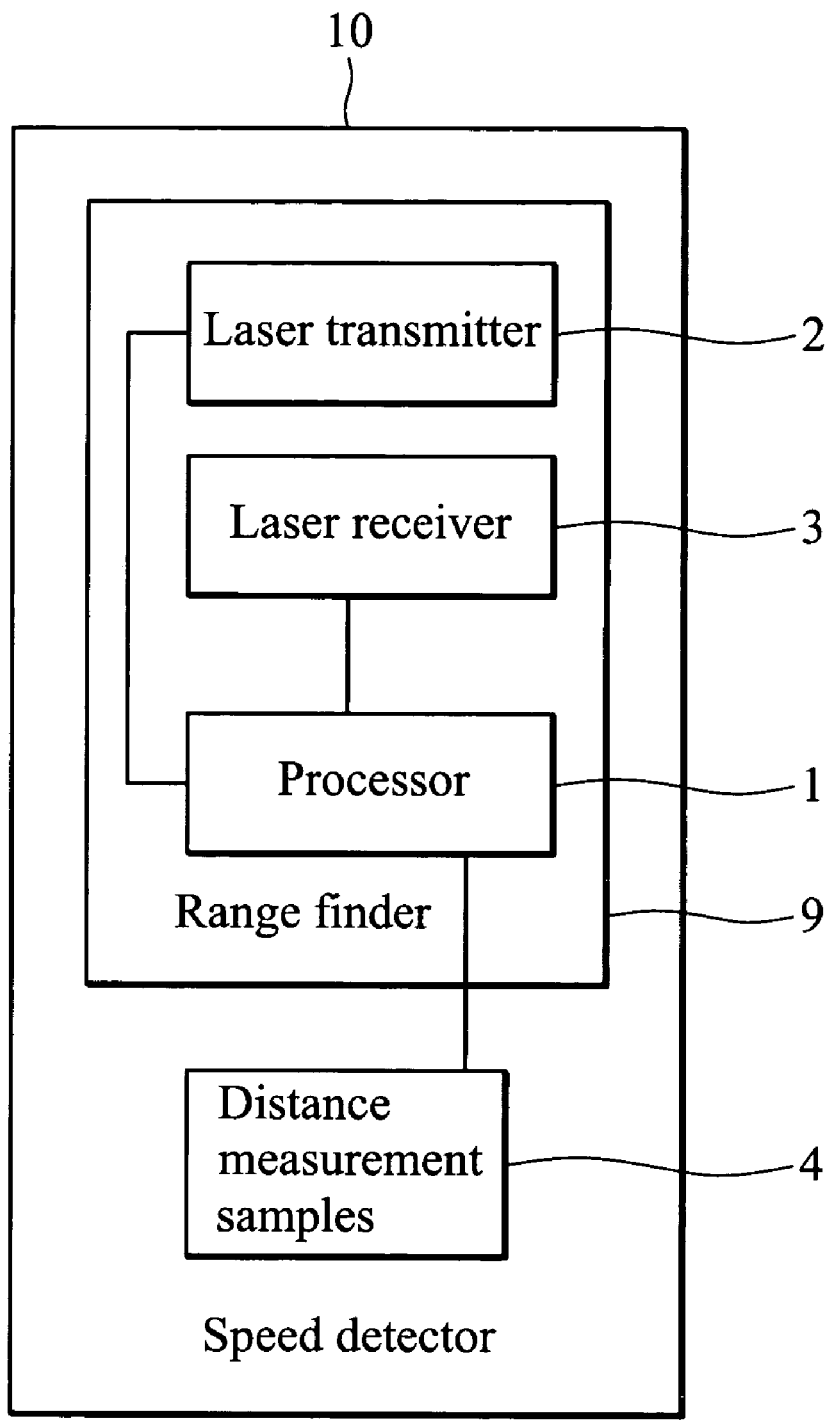
FIG. 3 is a block diagram of configuration of an exemplary embodiment of a speed detector.

As shown in FIG. 3, speed detector 10 comprises a plurality of entities: processor 1, laser transmitter 2, laser receiver 3, distance measurement samples 4, and range finder 9. The configuration of entities in FIG. 3 is an example and can be arranged differently. For example, distance measurement samples can be stored in a range finder; a processor can be located outside of a range finder;

or the range finder and a speed detector can respectively comprise a processor. Processor 1 is coupled to laser transmitter 2 and laser receiver 3, which respectively emits distance measurement laser pulses and receives reflected distance measurement laser pulses comprising noise.

Figure 1:
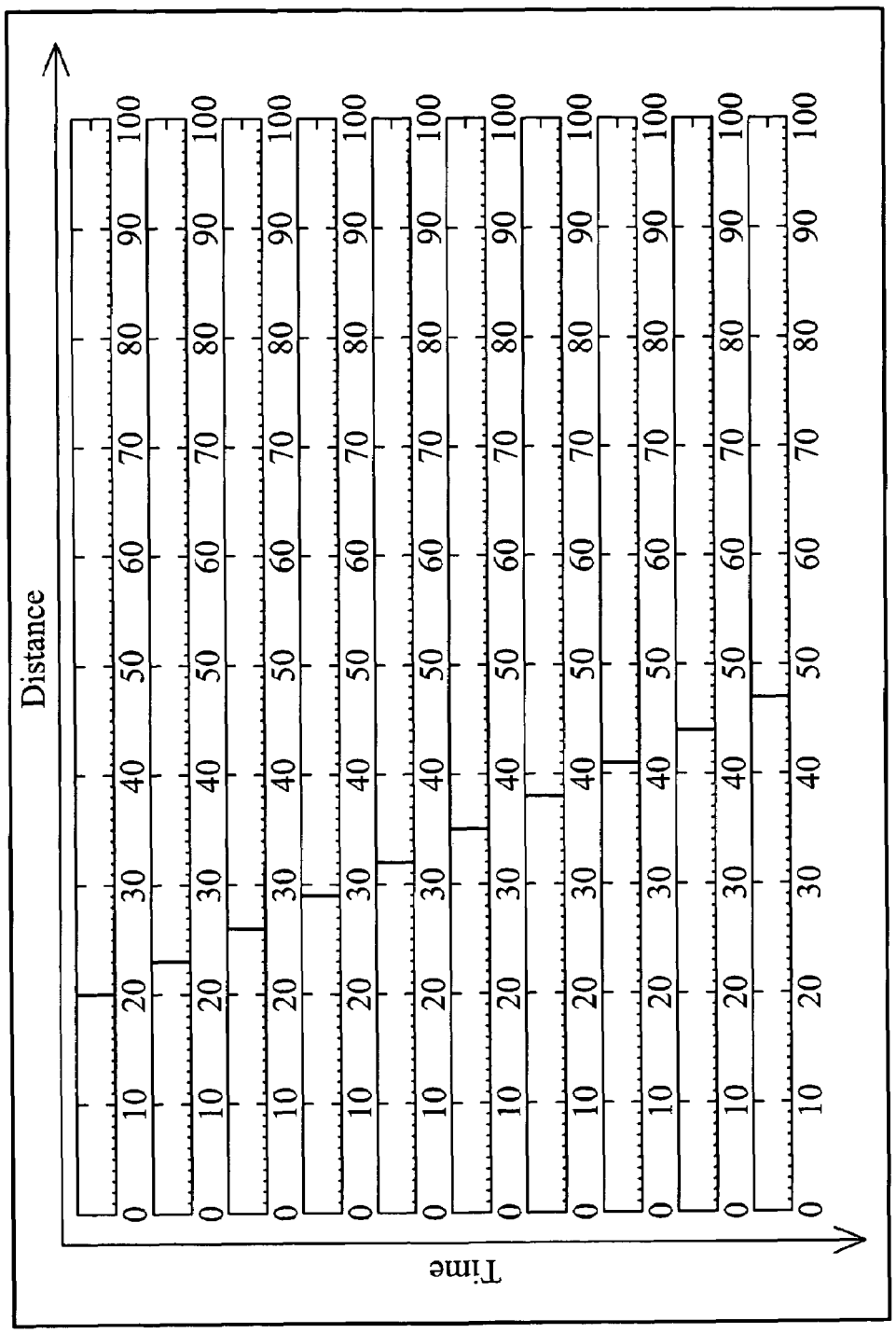
FIG. 1 is an ideal schematic diagram of distance measurement laser pulses reflected by a moving object.
Figure 2:
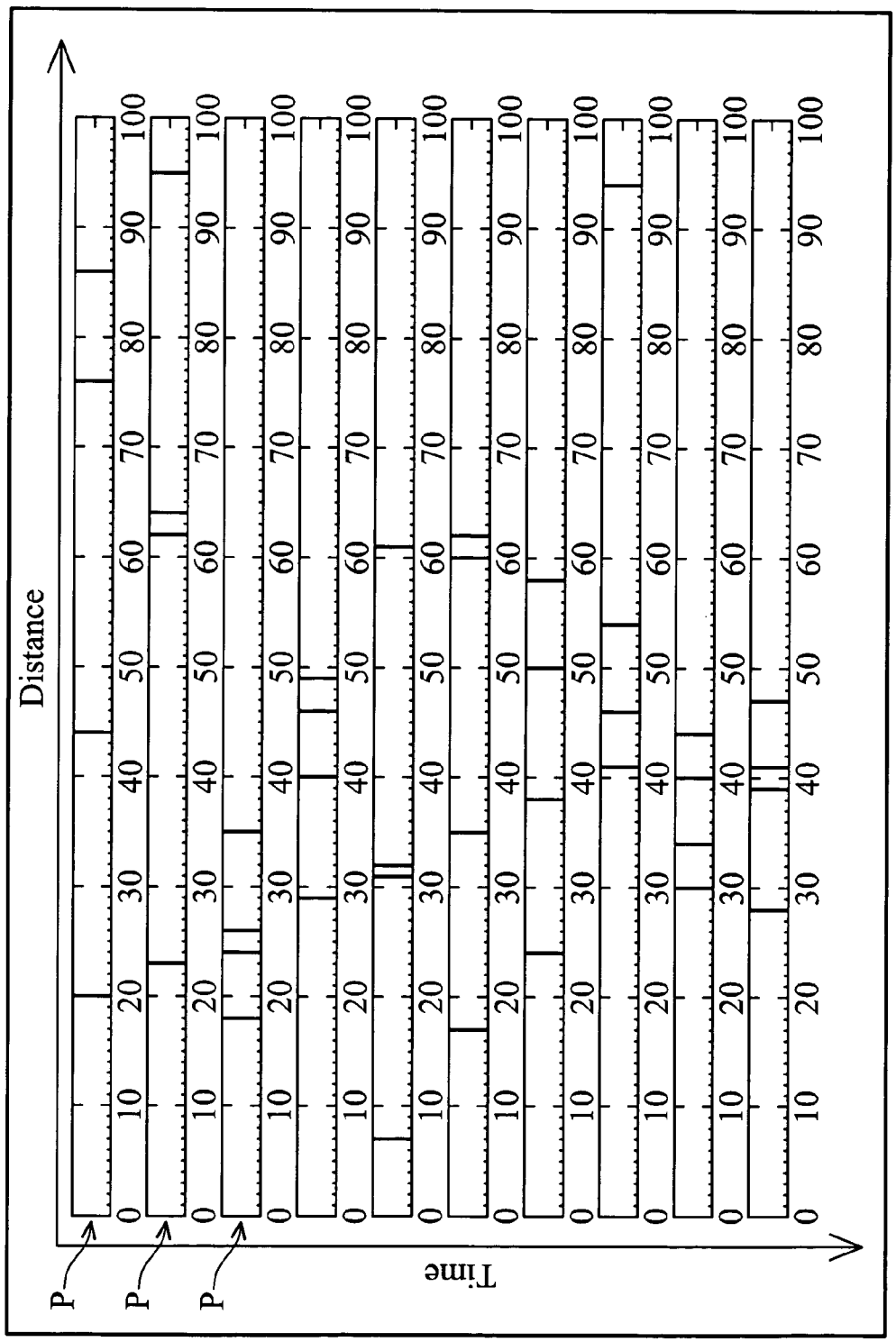
FIG. 2 is a schematic diagram of exemplary distance measurement laser pulses reflected by a moving object.
Figure 4:
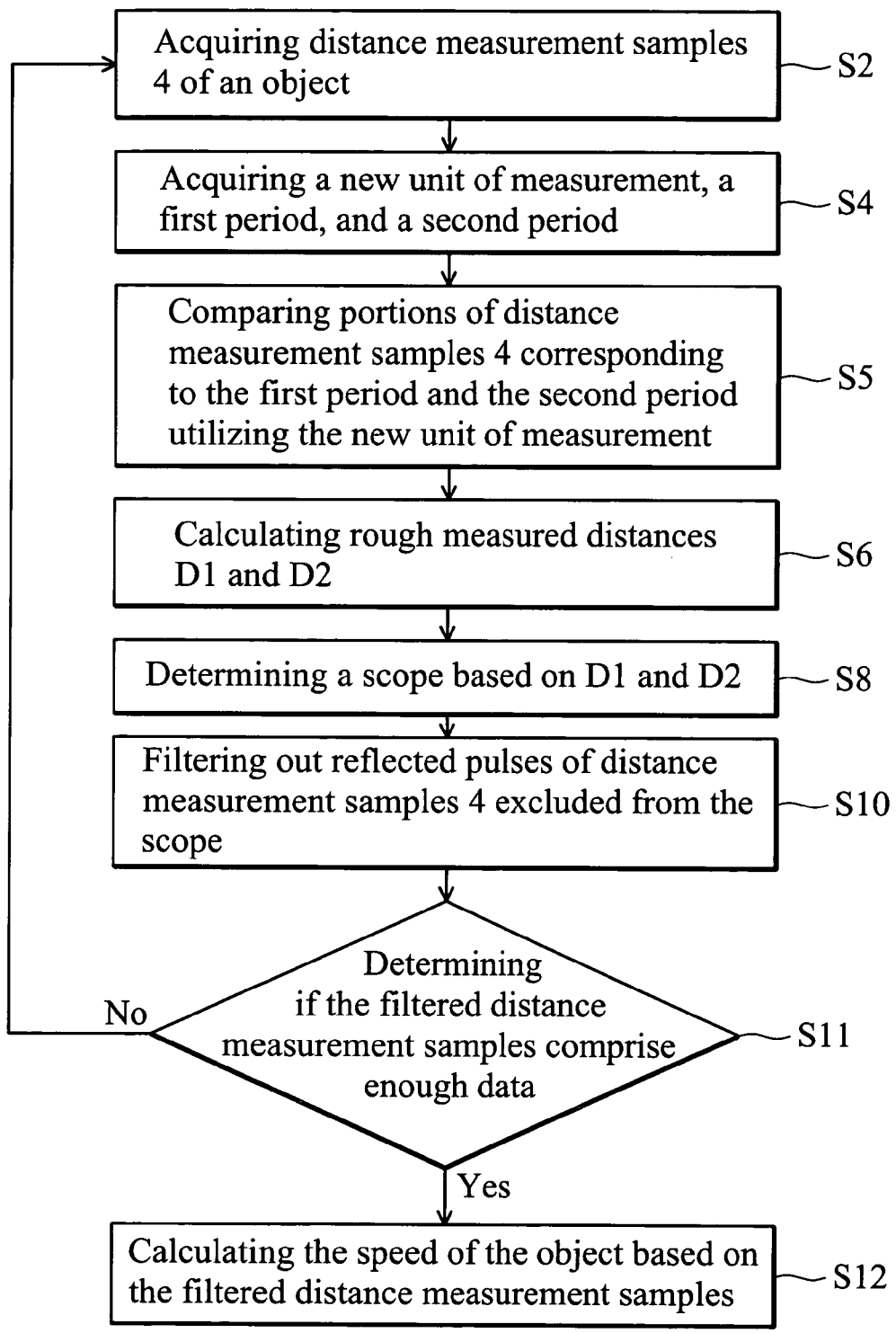
FIG. 4 is a flowchart of an exemplary embodiment of a speed detection method.

FIG. 4 is a flowchart of a speed detection method. Speed detector 10 acquires distance measurement samples 4 which is the received data of distance measurement of an object for N times utilizing range finder 9 during a period of time, as partially shown in FIG. 2 (step S2). Range finder 9 measures distance of the object with an original unit of measurement (such as one meter). The duration of time that speed detector 10 calculates the speed of the object is assumed to be restricted to t seconds, and range finder 9 is assumed to be capable of distance measurement for n1 times per second. The period may be shorter than or equal to t seconds, and N may be smaller than or equal to n1×t, wherein t is a real number, and N and n1 are positive integers.

The object detected by speed detector 10 may comprise a vehicle or other moving object, the speed of which may be restricted under to a maximum speed dependent on the type of object.

Processor 1 acquires a new unit of measurement (such as 10 meters), a first period, and a second period within the described period (step S4), so that the estimated distance of the object moves respectively in the first period and the second period are both less than the new unit of measurement. The new unit of measurement is greater than the original one. For example, the estimated distance can be derived by respectively multiplying the highest speed by the first period and highest speed by the second period. The new unit of measurement, the first period, and the second period can be predetermined and stored in speed detector 10 or dynamically determined by processor 1.

The first period and the second period are different periods and respectively comprise received pulse order Ti~Tj and received pulse order Tk~Tl. Ti, Tj, Tk, and Tl are positive integers. The first period and the second period may have equal duration, i.e. Tj−Ti=Tl−Tk, or not.

Distance measurement samples 4 are now detailed. Distance measurement samples 4 comprise N distance measurement samples (such as samples P in FIG. 2), each comprising a sequence of reflected pulses of a distance measurement laser pulse emitted by range finder 9 in a certain received pulse order, wherein 1<(Tj−Ti+1)<N and 1<(Tl−Tk+1)<N. Each reflected pulse corresponds to a scale measured with the original unit of measurement less than the new unit of measurement. Additionally, each reflected pulse is distributed in a planar coordinate system spanned by an time axis and a distance axis, with its corresponding received pulse order as its time-axis coordinate and its corresponding distance as its distance-axis coordinate respectively. Range finder 9 may calculate the corresponding distance of each reflected pulse.

For example, if a reflected pulse corresponds received pulse order T and distance D, the coordinate thereof can be represented by (T, D), wherein T is the time-axis coordinate thereof, and D is the distance-axis coordinate.

Processor 1 compares portions of distance measurement samples 4 corresponding to the first period and the second period utilizing the new unit of measurement (step S5) to calculate rough measured distances D1 and D2 of the object respectively corresponding to the first period and the second period (step S6).

The first period comprises (Tj−Ti+1) distance measurement samples. The second period comprises (Tl−Tk+1) distance measurement samples. Each distance measurement sample comprises a sequence of reflected pulses of a distance measurement laser pulse emitted by range finder 9, wherein each corresponding distance of each reflected pulse can be converted to and represented by a scale measured with the new unit of measurement.

The D1 is a distance measured with the new unit of measurement (i.e. a scale measured with the new unit of measurement) to which the most reflected pulses within the first period correspond, and D2 is another distance measured with the new unit of measurement (i.e. another scale measured with the new unit of measurement) to which the highest number of reflected pulses within the second period correspond.

For example, if a two dimensional array RawData[DISTANCE][N] represents distance measurement samples 4, DISTANCE may be the maximum scale measured with the original unit of measurement of speed detector 10. Two one-dimensional arrays, Dist1[DIST] and Dist2[DIST], represent the results of comparing portions of distance measurement samples 4 corresponding to the first period and the second period. $DIST=\lfloor(DISTANCE \times r)/R\rfloor$, wherein r and R are respectively the original unit and the new unit of measurement. 0~DIST represents the scales measured with the new unit of measurement in speed detector 10. Processor 1 respectively counts the number of reflected pulses in the (Tj−Ti+1) and the (Tl−Tk+1) distance measurement samples, corresponding to the least scale measured with the new unit of measurement, and respectively stores the counted numbers in Dist1[0] and Dist2[0]. Processor 1 respectively counts the number of reflected pulses in the (Tj−Ti+1) and the (Tl−Tk+1) distance measurement samples, corresponding to the second scale measured with the new unit of measurement, and respectively stores the counted numbers in Dist1[1] and Dist2[1]. Similarly, processor 1 can calculate values of all elements of Dist1[DIST] and Dist2[DIST]. Processor 1 acquires Dist1[d1] with maximum value from Dist1[DIST] and Dist2[d2] with maximum value from Dist2[DIST]. The first rough measured distance D1=d1×R/r, and the second rough measured distance D2=d2×R/r.

Processor 1 determines a scope based on the D1 and D2 for filtering the distance measurement samples 4 (step S8).

For example, a first line on the planar coordinate system is determined based on the first period, the second period, the D1, and the D2, wherein the scope comprise two parallel lines based on the first line.

Figure 5:
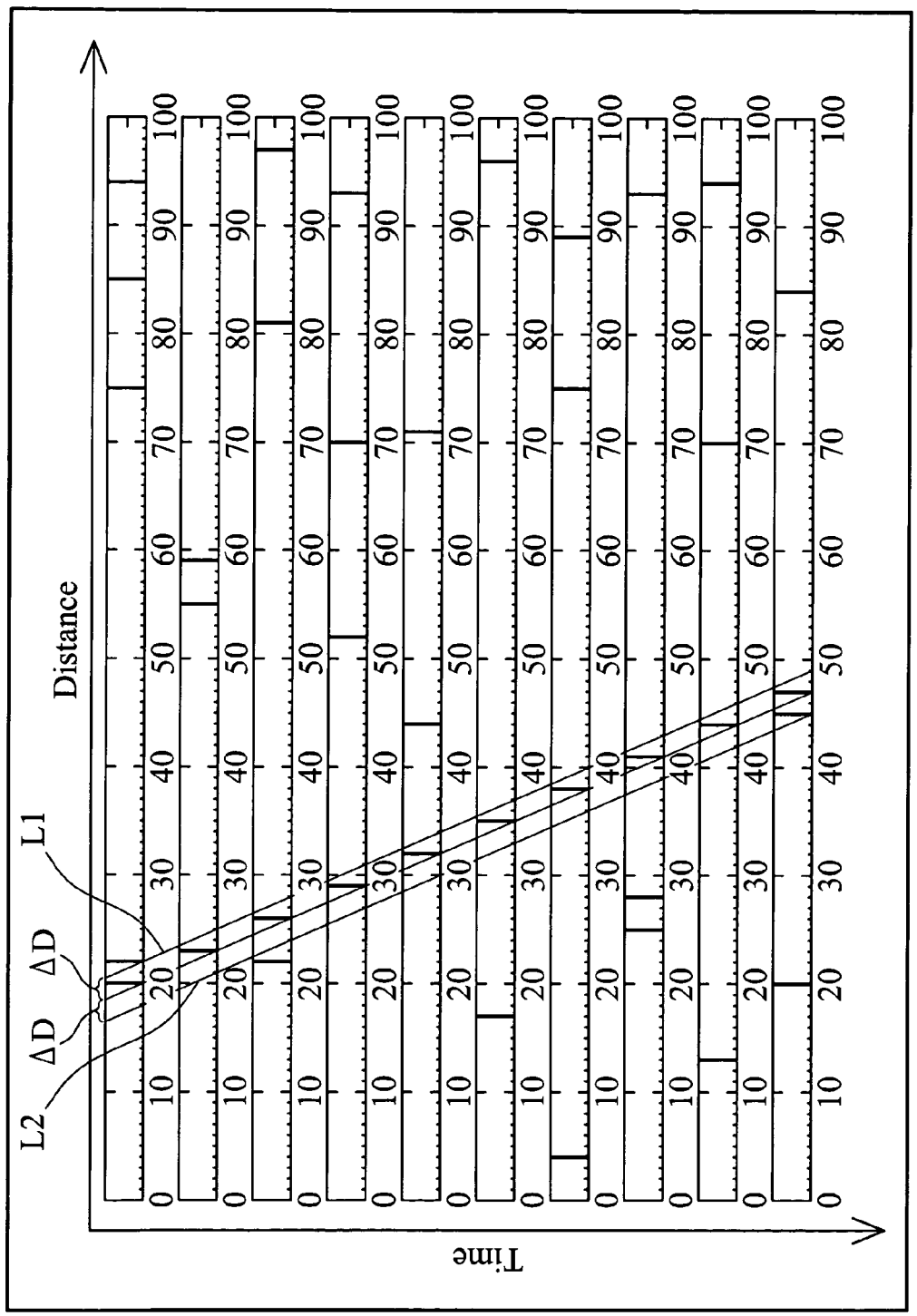
FIG. 5 is a schematic diagram of distance measurement laser pulses reflected by a moving object and an exemplary scope for filtering the distance measurement laser pulses.

The first line is determined by coordinates (Tn, D1) and (Tm, D2) on the planar coordinate system, wherein Ti≦Tn≦Tj and Tk≦Tm≦Tl, and |Tk−Ti|=|Tm−Tn|. As shown in FIG. 5, the two parallel lines comprise line L1 determined by coordinates (Tn, D1+ΔD) and (Tm, D2+ΔD) and another line L2 determined by coordinates (Tn. D1−ΔD) and (Tm, D2−ΔD), and ΔD is a distance offset, which may be a predetermined distance offset stored in speed detector 10 or dynamically determined by processor 1.

Processor 1 filters reflected pulses of distance measurement samples 4 excluded from the scope (step S10). In the given example of two parallel lines, reflected pulses between the two parallel lines are reserved as the filtered distance measurement samples, and the other reflected pulses are discarded.

Processor 1 determines if the filtered distance measurement samples comprise enough data (step S11). If not, step S2 is repeated. If so, processor 1 calculates the speed of the object based on the filtered distance measurement samples (step S12). For example, processor 1 calculates the speed of the object utilizing the method of least square or the method of weighted mean.

While the invention has been described by way of example and in terms of preferred embodiment, it is to be understood that the invention is not limited thereto. To the contrary, it is intended to cover various modifications and similar arrangements (as would be apparent to those skilled in the art). Therefore, the scope of the appended claims should be accorded the broadest interpretation so as to encompass all such modifications and similar arrangements.

What is claimed is:

1. A speed detection method, implemented in a speed detector comprising a range finder, comprising:
   acquiring by the range finder a specific number of distance measurement samples of an object during a period of time utilizing an original unit of distance measurement supported by the range finder;
   acquiring a new unit of distance measurement larger than respective movement distances of the object in a first period and a second period;
   calculating rough measured distances D1 and D2 respectively corresponding to the locations of the object in the first period and the second period by comparing portions of the distance measurement samples corresponding to the first period and the second period utilizing the new unit of measurement;
   determining a scope based on the distances D1 and D2 for filtering the distance measurement samples;
   utilizing the scope to filter the distance measurement samples; and
   calculating a speed of the object based on the filtered distance measurement samples.

2. The method as claimed in claim 1, wherein each of the distance measurement samples comprises a sequence of reflected pulses of a distance measurement laser pulse emitted by the range finder, each of the reflected pulses corresponds to a scale measured with the new unit of measurement, the D1 is a distance represented by a scale to which the most reflected pulses within the first period correspond, and the D2 is a distance represented by a scale to which the most reflected pulses within the second period correspond.

3. The method as claimed in claim 1, wherein each of the distance measurement samples comprises a sequence of reflected pulses of a distance measurement laser pulse emitted at a received pulse order by the range finder, each of the reflected pulses corresponds to a distance measured with the original unit of distance measurement smaller than the new unit and is distributed in a planar coordinate system spanned by a time axis and a distance axis, and the time-axis and distance-axis coordinates of each reflected pulse comprise the corresponding received pulse order and distance thereof respectively, further comprising determining a first line on the planar coordinate system based on the first period, the second period, the D1, and the D2, wherein the scope is based on the first line.

4. The method as claimed in claim 3, wherein the scope comprises two parallel lines based on the first line, reflected pulses between the two parallel lines are reserved as the filtered distance measurement samples, and the other reflected pulses are filtered out.

5. The method as claimed in claim 4, wherein the first period comprises received pulse order Ti~Tj, the second period comprises received pulse order Tk~Tl, the first line is determined by coordinates (Tn, D1) and (Tm, D2) on the planar coordinate system $Ti \leq Tn \leq Tj$ and $Tk \leq Tm \leq Tl$ the two parallel lines comprise a line determined by coordinates (Tn, D1+D) and (Tm, D2+D) and another line determined by coordinates (Tn, D1−D) and (Tm, D2−D), and D is a distance offset.

6. The method as claimed in claim 5, wherein Tj−Ti=Tl−Tk and |Tk−Ti|=|Tm−Tn|.

7. The method as claimed in claim 1, wherein the speed is calculated utilizing the method of least square or the method of weighted mean.

8. A speed detection method, implemented in a speed detector comprising a range finder, comprising:
   acquiring by the range finder a specific number of distance measurement samples of an object utilizing an original unit of distance measurement supported by the range finder, wherein each of the distance measurement samples comprises a sequence of reflected pulses of a distance measurement laser pulse emitted by the range finder in a received pulse order, each of the reflected pulses corresponds to a distance and is distributed in a planar coordinate system spanned by a time axis and a distance axis, and the time-axis and distance-axis coordinates of each reflected pulse respectively comprise the corresponding received pulse order and distance thereof;
   calculating a rough measured distances D1 and D2 respectively corresponding to the locations of the object in a first period and a second period by sampling portions of the distance measurement samples corresponding to the first period and the second period;
   determining a first line on the planar coordinate system based on the first period, the second period, the distance D1, and the distance D2;
   determining a scope based on the first line for filtering the distance measurement samples;
   utilizing the score to filter the distance measurement; and
   calculating a speed of the object based on the filtered distance measurement samples.

9. The method as claimed in claim 8, wherein the scope comprises two parallel lines based on the first line, reflected pulses between the two parallel lines are reserved as the filtered distance measurement samples, and the other reflected pulses are filtered out.

10. The method as claimed in claim 9, wherein the first period comprises received pulse order Ti~Tj, the second period comprises received pulse order Tk~Tl, the first line is determined by coordinates (Tn, D1) and (Tm, D2) on the planar coordinate system $Ti \leq Tn \leq Tj$ and $Tk \leq Tm \leq Tl$ the two parallel lines comprise a line determined by coordinates (Tn, D1+D) and (Tm, D2+D) and another line determined by coordinates (Tn, D1−D) and (Tm, D2−D), and D is a distance offset.

11. The method as claimed in claim 10, wherein Tj−Ti=Tl−Tk and |Tk−Ti|=|Tm−Tn|.

12. The method as claimed in claim 8, wherein the speed is calculated utilizing the method of least square or the method of weighted mean.

13. A speed detector, comprising:
   a range finder acquiring a specific number of distance measurement samples of an object during a period of time using an original unit of distance measurement of the range finder; and
   a processor coupled to the range finder, acquiring a new unit of distance measurement larger than the movement distances of the object in a first period and a second period respectively, calculating a rough measured distance D1 and D2 respectively corresponding to the locations of the object in the first period and the second period by comparing portions of the distance measurement samples corresponding to the first period and the second period utilizing the new unit of measurement, determining a scope based on the distance D1 and distance D2 for filtering the distance measurement samples, filtering the distance measurement samples based on the scope and calculating a speed of the object based on the filtered distance measurement samples.

14. The device as claimed in claim 13, wherein each of the distance measurement samples comprises a sequence of reflected pulses of distance measurement laser pulses emitted by the range finder, each of the reflected pulses corresponds to a scale measured with the new unit of measurement, the D1 is a distance represented by a scale to which the most reflected pulses within the first period correspond, and the D2 is a distance represented by a scale to which the most reflected pulses within the second period correspond.

15. The device as claimed in claim 13, wherein each of the distance measurement samples comprises a sequence of reflected pulses of a distance measurement laser pulse emitted in a received pulse order by the range finder, each of the reflected pulses corresponds to a distance measured with the original unit of distance measurement smaller than the new unit and is distributed in a planar coordinate system spanned by a time axis and a distance axis, the time-axis and distance-axis coordinates of each reflected pulse comprise the corresponding received pulse order and distance thereof respectively, the processor determines a first line on the planar coordinate system based on the first period, the second period, the D1, and the D2, wherein the scope is based on the first line.

16. The device as claimed in claim 15, wherein the scope comprises two parallel lines based on the first line, the processor reserves reflected pulses between the two parallel lines as the filtered distance measurement samples and filters out the other reflected pulses.

17. The device as claimed in claim 16, wherein the first period comprises received pulse order $Ti\sim Tj$, the second period comprises received pulse order $Tk\sim Tl$, the first line is determined by coordinates $(Tn, D1)$ and $(Tm, D2)$ on the planar coordinate system, $Ti \leq Tn \leq Tj$ and $Tk \leq Tm \leq Tl$, the two parallel lines comprise a line determined by coordinates $(Tn, D1+D)$ and $(Tm, D2+D)$ and another line determined by coordinates $(Tn, D1-D)$ and $(Tm, D2-D)$, and D is a distance offset.

18. The device as claimed in claim 17, wherein $Tj-Ti=Tl-Tk$ and $|Tk-Ti|=|Tm-Tn|$.

19. The device as claimed in claim 13, wherein the processor calculates the speed utilizing the method of least square or the method of weighted mean.

* * * * *